United States Patent
Kletzl et al.

(10) Patent No.: US 6,398,142 B1
(45) Date of Patent: Jun. 4, 2002

(54) RECORDING AND/OR REPRODUCING DEVICE HAVING A TAKE-UP REEL WITH LENGTH-ADJUSTMENT MEANS FOR THE LENGTH OF A PULL-OUT TAPE

(75) Inventors: Franz Kletzl, Mank; Hubert Schönhart, Guntramsdorf, both of (AT)

(73) Assignee: U.S. Philips Corporation, New York, NY (US)

( * ) Notice: Subject to any disclaimer, the term of this patent is extended or adjusted under 35 U.S.C. 154(b) by 57 days.

(21) Appl. No.: 09/619,187

(22) Filed: Jul. 19, 2000

(51) Int. Cl.[7] .................................................. G03B 1/58
(52) U.S. Cl. ............................. 242/332.4; 242/332.8; 242/532.7; 360/95
(58) Field of Search ........................ 242/332.4, 332.7, 242/332.8, 532.1, 532.6, 532.7, 582; 360/95

(56) References Cited

U.S. PATENT DOCUMENTS 3,606,192 A * 9/1971 Goddard
3,664,607 A * 5/1972 Trefzger et al.
4,477,851 A * 10/1984 Dalziel et al.
4,826,101 A * 5/1989 Smith
5,979,813 A * 11/1999 Mansbridge et al.
6,064,545 A * 5/2000 Kletzl
6,079,651 A * 6/2000 Hamming
6,082,652 A * 7/2000 Theobald

FOREIGN PATENT DOCUMENTS

WO    WO9844499    10/1998

* cited by examiner

Primary Examiner—William A. Rivera

(57) ABSTRACT

In a recording and/or reproducing device (1) having rotationally drivable take-up reel (15) having a pull-out tape (19) which has a first end (20) connected to the take-up reel (15) and having a pull-out element connected to the second end (21) of the pull-out tape (19). The take-up reel has a length adjustment mechanism in the area of its reel hub (17). With the aid of the length adjustment mechanism, the length of the pull-out tape (19) which extends between the take-up reel (15) and the pull-out element (12) can be adjusted.

4 Claims, 3 Drawing Sheets

RECORDING AND/OR REPRODUCING DEVICE HAVING A TAKE-UP REEL WITH LENGTH-ADJUSTMENT MEANS FOR THE LENGTH OF A PULL-OUT TAPE

BACKGROUND OF THE INVENTION

The invention relates to a recording and/or reproducing device.

Such a recording and/or reproducing device is known, for example, from the patent document WO 98/44499 A1. In this known device the pull-out tape has its first end fixedly connected to the take-up reel in the area of the take-up reel hub.

In a recording and/or reproducing device of the present type it is important that the length of the pull-out tape between the take-up reel and the pull-out element corresponds as accurately as possible to a given nominal value because only then is it guaranteed that the pull-out element lies as accurately as possible in a nominal position once the pull-out tape has been wound onto the reel hub of the take-up reel and the pull-out element has engaged the recess of the take-up reel. This is important because otherwise an incorrectly positioned and unfavorably disposed pull-out element adversely affects a proper take-up of the record carrier, which takes the form of a tape and has been pulled out of a cassette, onto the take-up reel.

In the known device in accordance with the patent document WO 98/44499 A1 the required exact length of the pull-out tape is obtained by accurately manufacturing the pull-out tape and accurately attaching it to the take-up reel. However, this requires a comparatively high manufacturing accuracy and mounting accuracy and entails corresponding costs. Moreover, there is no remedy against any possible changes in the length of the pull-out tape existing between the take-up reel and the pull-out element. Such changes, which may also give rise to an excessively inaccurate positioning of the pull-out element with respect to the take-up reel, may be caused temperature influences and humidity influences depending on the material used for the pull-out tape.

It is an object of the invention to preclude the problems mentioned hereinbefore, or at least to reduce them to an extent which is insignificant in practice, and to provide an improved recording and/or reproducing device.

SUMMARY OF THE INVENTION

According to the invention, in order to achieve this object the characteristic features have been provided in a recording and/or reproducing device. By providing the characteristic features in accordance with invention in a recording and/or reproducing device in accordance with the invention it is achieved in a simple manner that, if necessary, the length of the pull-out tape existing between the take-up reel and the pull-out element can simply be adjusted with the aid of the length adjustment means. Such an adjustment of said length of the pull-out tape may be carried out for the first time during the manufacture of a recording and/or reproducing device in accordance with the invention. However, such an adjustment of this length may also be carried out at a later time, for example in order to compensate for length variations caused by aging effects, temperature influences or humidity influences.

In a recording and/or reproducing device in accordance with the invention the length adjustment means may be constructed in various ways. For example, a rotatably mounted anchoring element may be provided in the interior of the reel hub of the take-up reel, the second end of the pull-out tape being fixedly connected to said anchoring element, onto which more pull-out tape or less pull-out tape can be wound in that it said element is rotated, thereby enabling a length adjustment to be achieved. However, it has proved to be very advantageous when, in addition, the characteristic features are provided in a recording and/or reproducing device in accordance with the invention. This is advantageous because this enables a very fine adjustment of the length of the pull-out tape to be achieved.

In a recording and/or reproducing device in accordance with the invention having such an adjustable length adjustment element it has proved to be very advantageous. This results in a particularly simple and uniform adjustment of the length of the pull-out tape.

This enables the length adjustment element to be securely fixed in the position it occupies after a length adjustment process.

The above-mentioned as well as further aspects of the invention will become apparent from the example of an embodiment described hereinafter and will be elucidated with reference to this example.

The invention will now be described in more detail with reference to the drawings, which show an example of an embodiment to which the invention is not limited.

DETAILED DESCRIPTION

Figure 1:
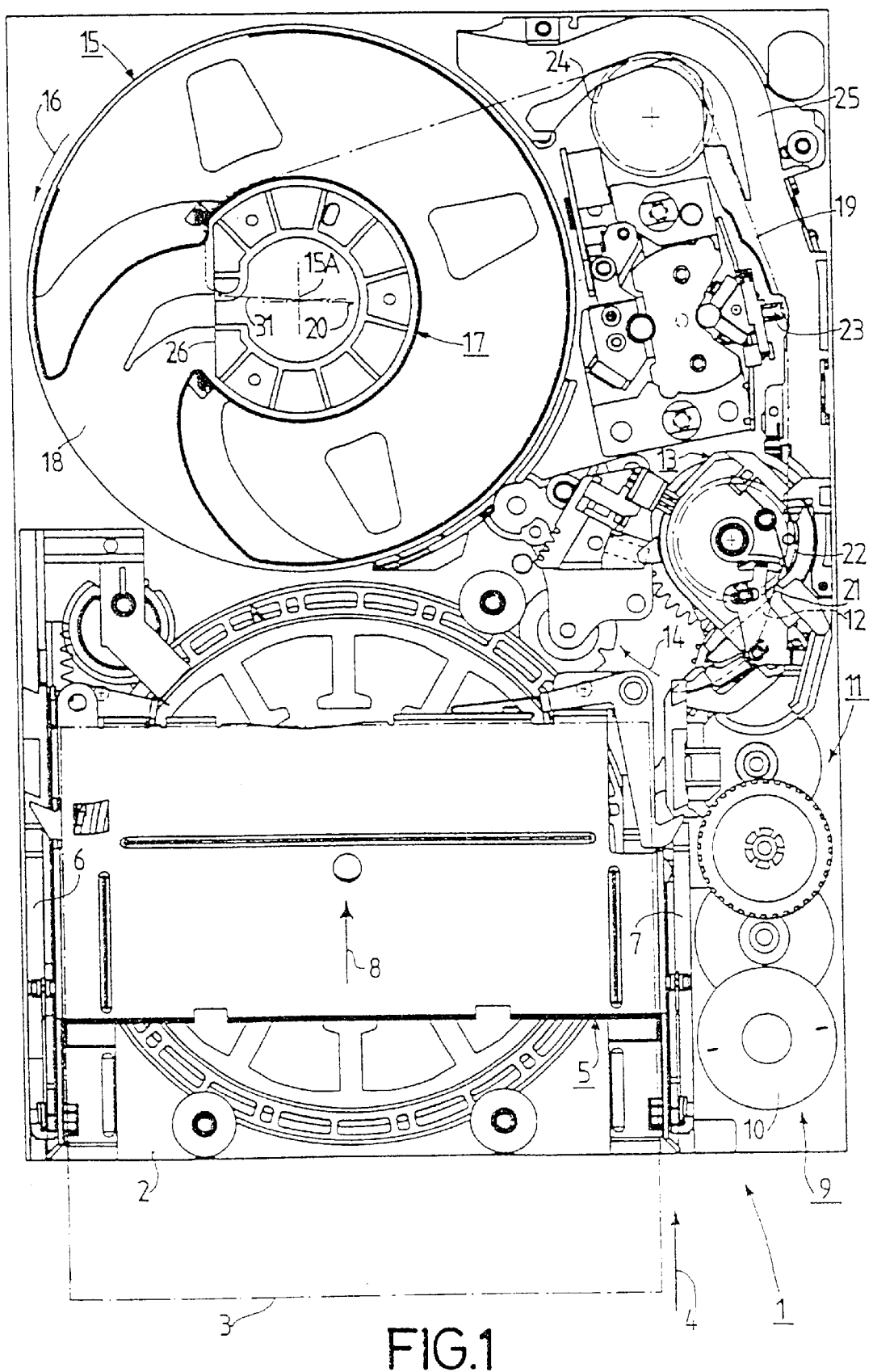
FIG. 1 is a plan view which shows an example of an embodiment of a recording and reproducing device in accordance with the invention, which includes a rotationally drivable take-up reel and a pull-out tape connected thereto.

FIG. 1 shows a recording and reproducing device 1, which is briefly referred to hereinafter as the device 1. The device 1 has a chassis 2, which shown only diagrammatically in FIG. 1 and which serves to carry a multitude of parts of the device 1. A cassette 3, shown only in dash-dot lines in FIG. 1, can be loaded into the device 1. The cassette 3 can be inserted into a cassette holder 5 of the device 1 in a direction indicated by an arrow 4. The cassette holder 5 is movable between a loading position, in which the cassette 3 can be inserted into the cassette holder 5, and an operating position, in which the inserted cassette 3 is in an operating position in the device 1, with the aid of two guide walls 6 and 7 in which L-shaped guide slots have been provided. With the aid of the L-shaped guide slots, which are engaged by guide pins which project laterally from the cassette holder 5, the cassette holder 5 can first be moved from its loading position in the direction indicated by an arrow 8 and can subsequently be moved, i.e. lowered, towards the chassis 2 in a direction perpendicular to the direction indicated by the arrow 8. For moving the cassette holder 5 the device 1 has actuating means 9, which include a drive motor 10 and a drive mechanism 11 which is drivable with the aid of a drive motor 10.

The device 1 is adapted to record and reproduce information signals, in the present case data signals, onto a record carrier in the form of a tape, i.e. a magnetic tape. The magnetic tape, not shown in FIG. 1, is accommodated in a cassette 3 to be loaded into the device 1. The magnetic tape has been wound onto a supply reel accommodated in the cassette 3 and has one end connected to the hub of the supply reel, the other end of the magnetic tape forming a free end, where the magnetic tape has been provided with a tape pull-out pin, with the aid of which the magnetic tape can be pulled out of the cassette 3.

The device 1 has a pull-out element 12, which is movable in the direction indicated by an arrow 14 from an initial position, shown in FIG. 1, into a coupling position, not shown in FIG. 1, with the aid of an actuating device 13, during which movement in the direction indicated by the arrow 14 the pull-out element 12 can be coupled to the pull-out pin accommodated in the cassette 3 and connected to the magnetic tape.

The device 1 further has a take-up reel 15 which is drivable so as to be rotated about a reel axis 15A by means of a drive motor, not shown. The take-up reel 15 has a reel hub 17 and a first reel flange 18, shown in FIG. 1, which is disposed nearer the chassis 2, as well as a second reel flange, which is not shown in FIG. 1, which covers the reel hub 17 substantially completely and which only has two access openings in its area which faces the reel hub 17, through which openings parts inside the reel hub 17 are accessible, which will be described in further detail hereinafter.

Figure 2:
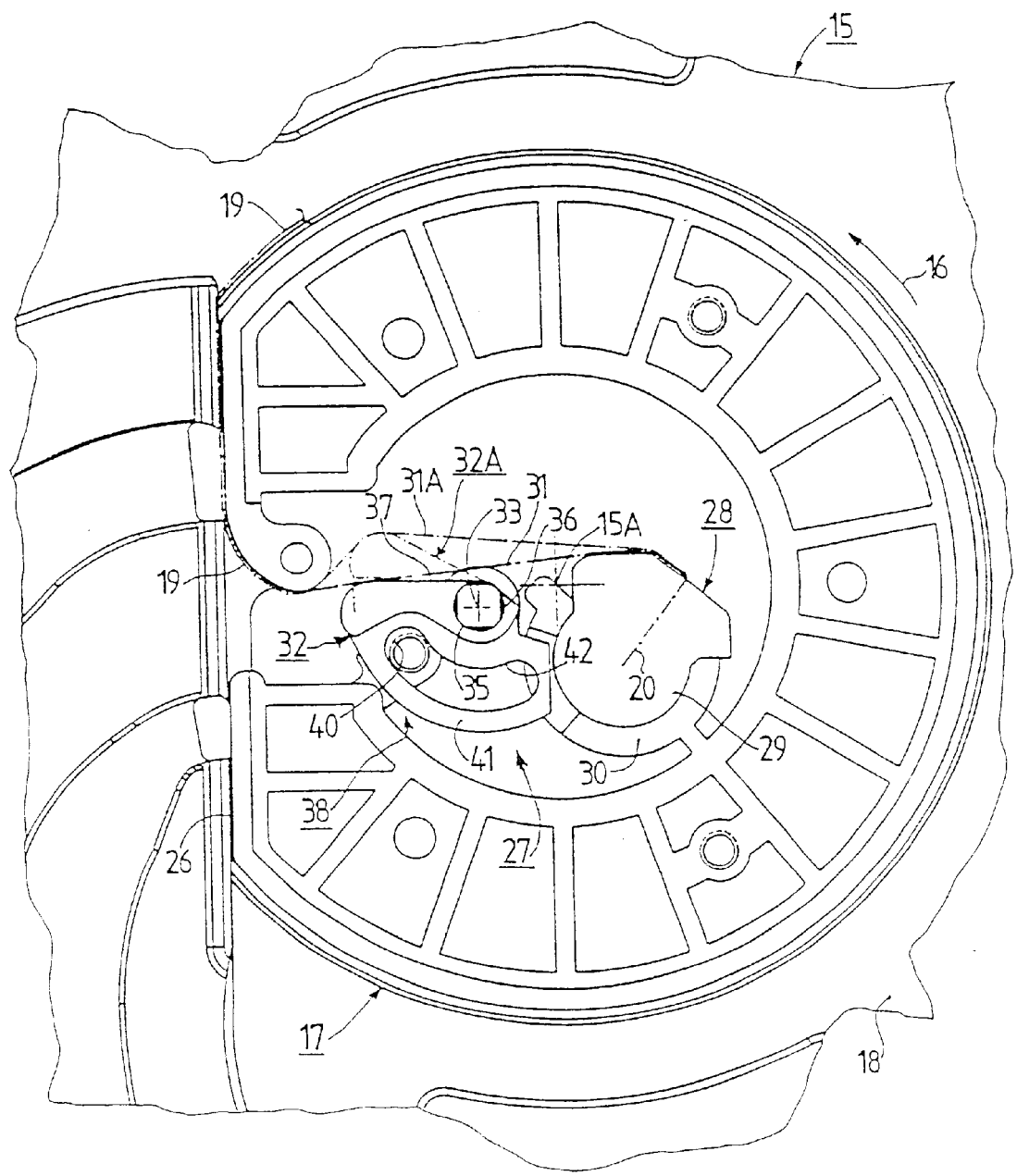
FIG. 2 shows a part of the take-up reel of the recording and reproducing device of FIG. 1 to an enlarged scale with respect to FIG. 1, which part mainly comprises the reel hub of the take-up reel, which hub accommodates the length adjustment means for the adjustment of the length of the pull-out tape.

The device 1 further has a pull-out tape 19, shown in dash-dot lines in FIGS. 1 and 2. The pull-out tape 19 has a first end 20 and a second end 21. In the area of its first end 20 the pull-out tape 19 is connected to the take-up reel 15 at the location of the reel hub 17, which connection is not shown in FIG. 1 but is illustrated in detail in FIG. 2. The pull-out element 12 is connected to the pull-out tape 19 in the area of the second end 21 of the pull-out tape 19. Thus, it is achieved that in the device 1 a magnetic tape accommodated in a cassette 3 loaded into the device 1 can be pulled out of the cassette 3 and can be fed to the take-up reel 15 with the aid of the elements 15, 19, 12 of the device 1 in that the take-up reel 15 is driven in the direction indicated by the arrow 16 and in that, as a consequence, the pull-out tape 19 and the pull-out element 12 are driven. During such driving of the pull-out tape 19 and of the pull-out element 12 the pull-out tape 19 is guided with the aid of a first guide roller 22, a magnetic head 23 and a second guide roller 24, and the pull-out element 12 is guided with the aid of superposed guide rails 25, which guide rails 25 have guide grooves and by means of these guide grooves ensure that the pull-out element 12 cannot contact the two guide rollers 21 and 24 and the magnetic tape 23 in an undesirable manner during its movement to the take-up reel 15.

In order to accommodate the pull-out element 12 the take-up reel 15 has a recess 26 which has been provide mainly in the area of the reel hub 17. Positioning means, not shown, have been provided in order to position the pull-out element 12 in the recess 26 of the take-up reel 15.

It is to be noted that the above description of the device 1 has been kept concise because comprehensive descriptions of various details of this device 1 are given in the following European patent applications filed on Nov. 12, 1998 and having the application numbers: 98 890 332.4, 98 890 333.2, 98 890 334.0, 98 890 335.7, 98 890 336.5, 98 890 337.3, 98 890 338.1, 98 890 339.9 and 98 890 340.7.

Figure 3:
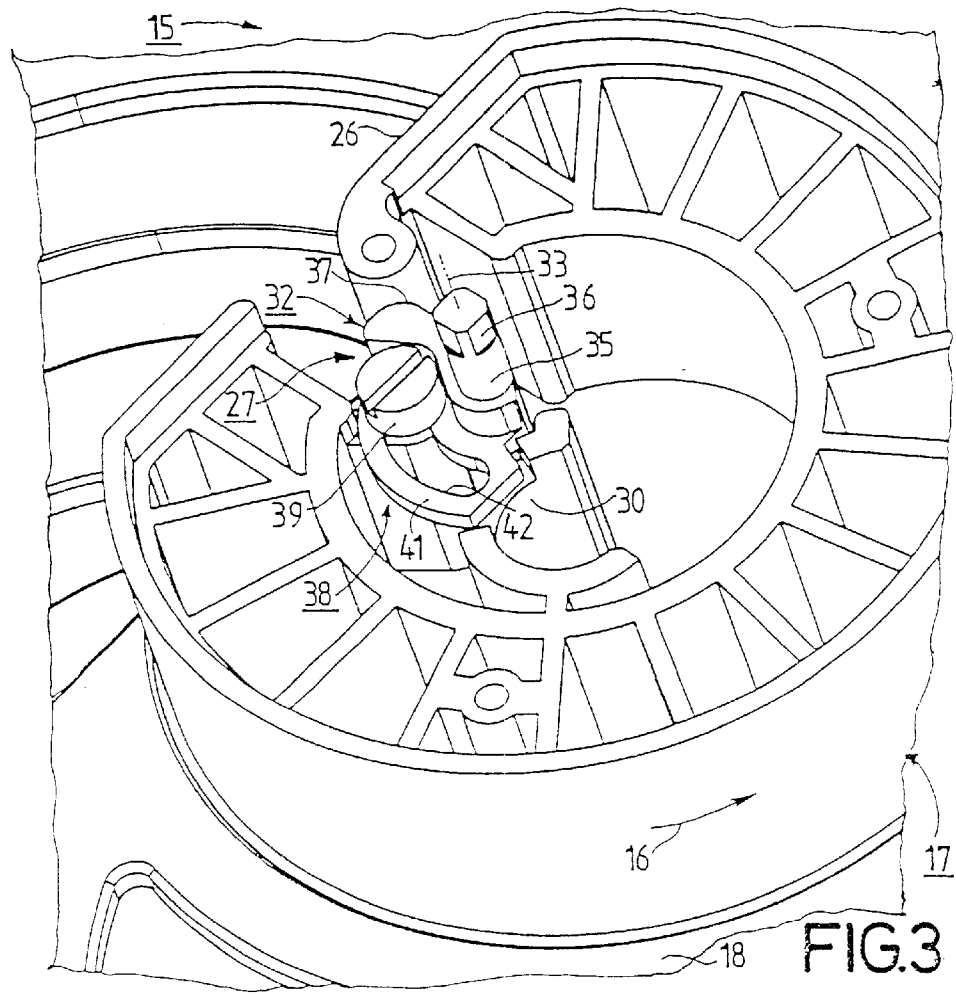
FIG. 3 is an oblique view from the top, which essentially shows the part of the take-up reel shown in FIG. 2.
Figure 4:
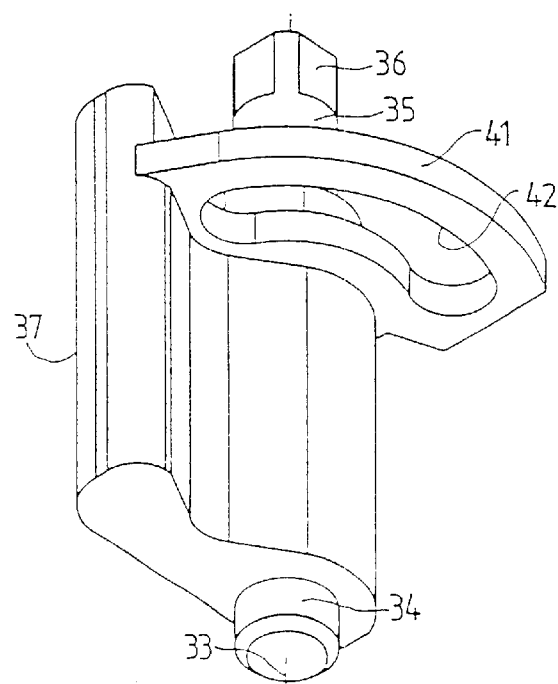
FIG. 4 is an oblique view from underneath, which shows a length adjustment element of the length adjustment means of the take-up reel shown in FIGS. 2 and 3.

As is apparent from FIGS. 2 and 3, the take-up reel 15 advantageously has length adjustment means 27 in the area of the reel hub 17. The length adjustment means 27 have been provided and are adapted to cooperate with the pull-out tape 19 in an area which adjoins the first end 20. The length of the pull-out tape 19 between the take-up reel 17 and the pull-out element 12 is adjustable with the aid of the length adjustment means 27.

As is apparent from FIG. 2, the pull-out tape 19 has its first end 20 fixedly connected to an anchoring element 28, which is immobilized in the interior of the reel hub 17. The anchoring element 28 has a take-up slot, not shown, into which the first end 20 can be inserted before the anchoring member 28 is mounted into the reel hub 17. After the insertion of the first end 20 into the anchoring element 28 the anchoring element 28 is pressed together so as to fix the first end 20 in the anchoring element 28, after which the anchoring element 28 is fitted with a mounting portion 29 in the form of a part of a cylinder into a mounting sleeve 30 inside the reel hub 17 in the direction of the reel axis 15A of the take-up reel 15 and subsequently forms a press-fit in the mounting sleeve 30. A portion 31 of the pull-out tape 19 then extends from the anchoring element 28 into the area of the recess 26 of the take-up reel 17.

The length adjustment means 27 include a movable length adjustment element 32 arranged in the interior of the reel hub 17 and provided and adapted to cooperate with said portion 31 of the pull-out tape 19. The length adjustment element 32 is mounted so as to be pivotable about a pivotal axis 33. The pivotal axis 33 is defined by a first trunnion 34 and a second trunnion 35. The first trunnion 34 engages rotatably in a recess in the reel flange 18. The second trunnion 35 engages rotatably in the reel flange which is not shown in FIGS. 1 to 3. The length adjustment element 32 has a square head portion 36 which adjoins the second trunnion 35 and which can be actuated by means of a square box wrench, as a result of which the length adjustment element 32 is pivotable about the pivotal axis 33 by means of such a square box wrench, for example into the position marked with the reference numeral 32A in FIG. 2. The length adjustment element 32 has an actuating surface 37 which is rounded and which is intended for cooperation with the pull-out tape 19 and by means of which said portion 31 of the pull-out tape 19 is movable transversely to the plane of the tape, i.e. for example into the position marked with the reference numeral 31A shown in FIG. 2.

By pivoting the length adjustment element 32 from the position shown in solid lines in FIG. 2 into the position 32A shown in dash-dot lines in FIG. 2, said portion 31 of the pull-out tape 19 is movable from the initial position shown in FIG. 2 into the further position 31A shown in FIG. 2, as a result of which the length of the pull-out tape 19 which extends between the take-up reel 15 and the pull-out element 12 is reduced to a desired nominal value.

In the present case, the length adjustment means 27 in addition include position locking means 38 for the length adjustment means 32. The position locking means 38 comprise a locking screw 39 and a threaded bore 40 formed in the reel flange 18, into which threaded bore the locking screw 39 can be fitted. The position locking means 38 are adapted to cooperate with the length adjustment element 32. For this purpose, the length adjustment element 32 has a plate-shaped projection 41 in which a circularly arcuate slot 42 has been provided through which the locking screw 39 extends. The length adjustment element 32 can be fixed in any position with the aid of the position locking means 38 and can thus be held securely in the respective adjusted position.

In order to enable both the square head portion 36 and the locking screw 39 to be actuated in a simple manner at any time, two openings have been provided in the take-up reel 15 in its reel flange which is not shown in the Figures, through which openings a square box wrench and a screwdriver for actuating the square head portion 36 in order to pivot the length adjustment element 32 and the locking screw 39 and for loosening and tightening the locking screw 39, respectively.

With the aid of the length adjustment means 27 provided in the device 1 a simple adjustment of the length of the pull-out tape 19 which extends between the take-up reel 15 and the pull-out element 12 is guaranteed. Thus, the effective length of, for example, too long a pull-out tape 19 can be reduced, as a result of which an excess length, which would adversely affect a correct winding of a magnetic tape onto the reel hub 17 of the take-up reel 13, can be eliminated.

The invention is not limited to the embodiment described hereinbefore by way of example. There are a variety of further possibilities of realizing the connection of the first end 20 of the pull-out tape 19 to the reel hub 17 of the take-up reel 15 and the length adjustment means 27. The connection of the first end 20 may also be realized with the aid of an adhesive joint. The length adjustment means 27 may alternatively comprise an adjustable slide as the length adjustment element.

What is claimed is:

1. A recording and/or reproducing device (1)
  adapted to record and/or reproduce information signals on and/or from a record carrier in the form of a tape accommodated in a cassette (3) which is loaded into the recording and/or reproducing device (1), and
  which includes a rotationally drivable take-up reel (15) having a reel hub (17) and at least one reel flange (18), and
  which has been provided with a pull-out tape (10) having a first end (20) and a second end (21) and having its first end (20) connected to the reel hub (15) in the area of the reel hub (17), and
  having a pull-out element (12) which is connected to the pull-out tape (19) in the area of the second end (21) and which is engageable in a recess (26) of the take-up reel (15), and
  in which a record carrier in the form of a tape accommodated in a cassette (3) loaded into the recording and/or reproducing device (1) is pulled out of the cassette (3) and is fed to the take-up reel (15) with the aid of the pull-out element (15, 19, 12) of the recording and/or reproducing device (1), characterized in that
  the take-up reel (15) has length adjustment means (27) within the circumference of the take-up reel hub (15), and
  the length adjustment means (27) have been provided and are adapted to cooperate with the pull-out tape (19) with a portion (31) adjoining the first end (20), and
  the length of the pull-out tape (19) which extends between the take-up reel (15) and the pull-out element (12) is adjustable with the aid of the length adjustment means (27).

2. A recording and/or reproducing device (1) as claimed in claim 1, characterized in that
  the pull-out tape (19) has its first end (20) fixedly connected to an anchoring element (28) which is immobilized in the interior of the reel hub (17), and
  a portion (31) of the pull-out tape (19) extends from the anchoring element (28) into the area of the recess (26) of the take-up reel (15), and
  the length adjustment means (27) have a movable length adjustment element (32) arranged in the interior of the reel hub (17) and provided and adapted to cooperate with said portion (31) of the pull-out tape (19).

3. A recording and/or reproducing device (1) as claimed in claim 2, characterized in that
  the length adjustment element (32) is mounted so as to be pivotable and has an actuating surface (37) by means of which said portion (31) of the pull-out tape (19) is adjustable transversely to the plane of the tape.

4. A recording and/or reproducing device (1) as claimed in claim 2, characterized in that
  position locking means (38) have been provided for the length adjustment element (32), which position locking means are adapted to cooperate with the length adjustment element (32) and with the aid of which the length adjustment element (32) is locked in any position.

* * * * *